United States Patent [19]

Moore

[11] 3,712,660
[45] Jan. 23, 1973

[54] LITTER RETRIEVING DEVICE
[75] Inventor: Joseph L. Moore, Lexington, Ky.
[73] Assignee: Moore Associates, Lexington, Ky.
[22] Filed: Nov. 15, 1971
[21] Appl. No.: 198,641

[52] U.S. Cl. .................................................294/61
[51] Int. Cl. ..............................................B08b 1/00
[58] Field of Search...................294/50, 50.5, 51, 61

[56] References Cited

UNITED STATES PATENTS 2,804,336   8/1957   Thompson..............................294/61
2,642,306   6/1953   Beeler.....................................294/61

Primary Examiner—Harvey C. Hornsby
Assistant Examiner—Douglas Bellis
Attorney—William E. Sherwood

[57] ABSTRACT

A hand held litter retrieving device selectively operable to pick up articles, such as glass bottles, without breaking the same, or to pickup puncturable articles, such as paper, is disclosed.

3 Claims, 2 Drawing Figures

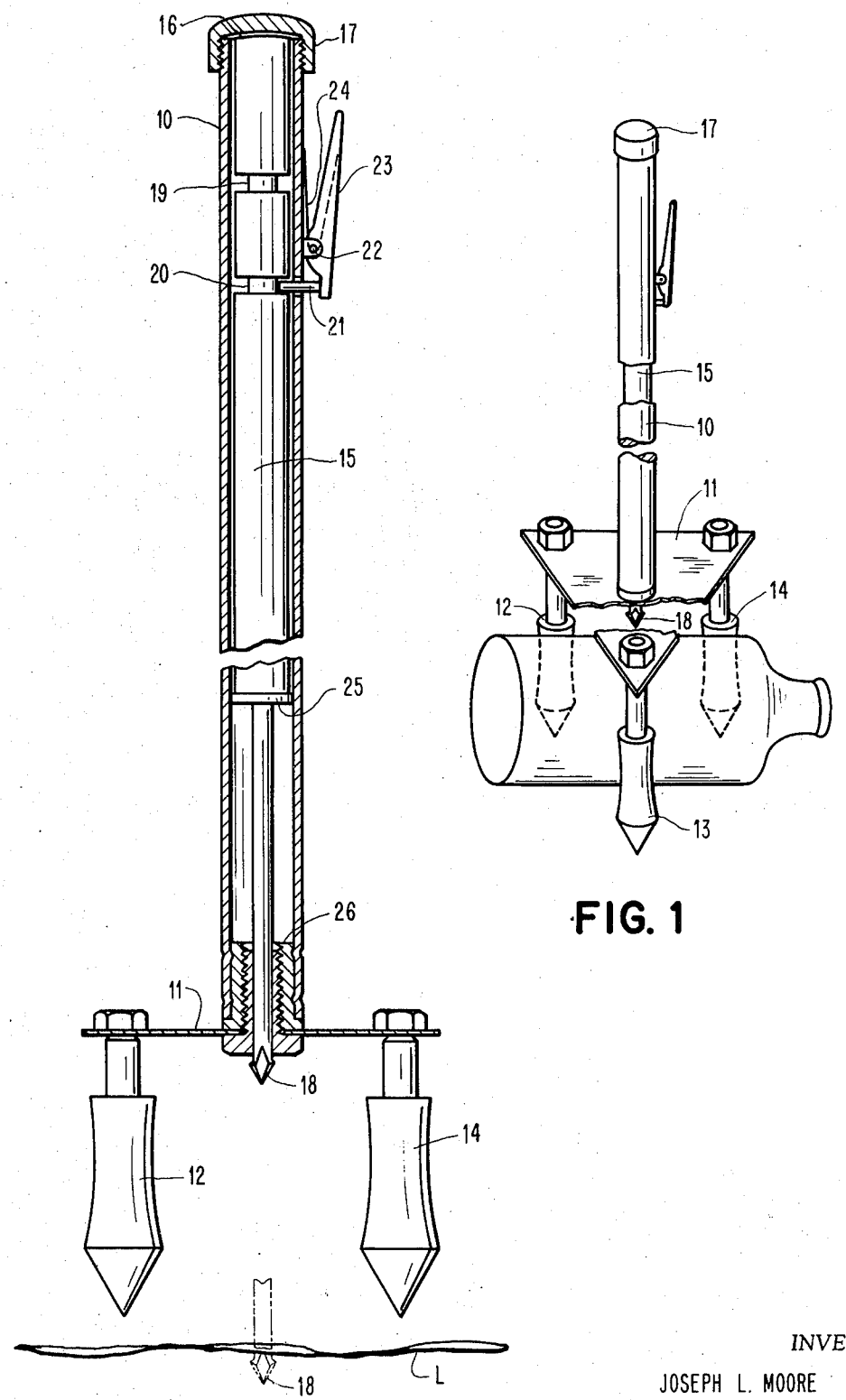

LITTER RETRIEVING DEVICE

BACKGROUND OF THE INVENTION

As more fully disclosed in my co-pending application, Ser No. 182,950, filed Sept. 23, 1971 the efficient retrieving of litter by means of hand-held devices requires the employment of a device which must be readily adaptable to diverse forms of such litter and to use in widely differing environments. In that patent application certain arrangements for mounting an array of fingers for engaging and lifting articles, such as bottles, cans or the like, are disclosed. However, litter often comprises paper, cloth, flattened metal cans, plastic articles and the like which can more efficiently be retrieved by a puncturing member attached to the device and wherein the functioning of the fingers is not required. Moreover, a large proportion of such litter can be impaled by a free falling puncturing member requiring no physical exertion by the user other than positioning the device immediately over the litter to be punctured and thereafter lifting the device and removing the impaled litter from that member. At the same time the capability of the device to pick up convex shaped, non-punctured articles should be preserved.

It is these and similar requirements for the retrieving of diverse forms of litter which it is purpose of the present invention to provide.

SUMMARY OF THE INVENTION

The litter-retrieving device includes a hollow handle attached at its lower end to a means for supporting a plurality of spaced fingers adapted for confining a bottle or can therebetween and for applying a holding pressure separately upon each finger when engaged with the bottle or can. A rod is reciprocably mounted in the handle and has a litter-piercing member attached to its lower end. Manually operated means mounted on the handle serves to latch the rod in either a retracted position in which the member is inoperative and cannot interfere with the article-engaging action of the fingers, or in an extended position in which the member can puncture litter.

Among the objects of the invention are the provision of a simple and inexpensive hand-held litter retrieving device which may be employed optionally to pick up bottles or cans or to pick up puncturable litter objects; the provision of a litter retrieving device which optionally may puncture litter by means of a free falling puncturing member or by means of a latched puncturing member which may be pushed into the litter to puncture the same; and the provision of a litter retrieving device which may be readily assembled or disassembled.

These and other objects and advantages of the invention will become more apparent as the description proceeds and when considered in conjunction with the accompanying drawings in which FIG. 1 is a perspective view, with parts broken away, of one form of device showing its employment in retrieving a bottle, and FIG. 2 is a view partly in section and to a larger scale, showing the device when employed to penetrate litter and without requiring the fingers to lift that litter.

Referring first to FIG. 1 an elongated hollow handle 10 is attached at its lower end to a suitable means 11 for supporting an array of substantially uniformly spaced fingers, here shown as being three in number as indicated at 12, 13, 14. As more fully described in the aforementioned application, each of the fingers has a body portion specially shaped to engage the outer surface of a convex object such as a bottle or a can so that when two or more of such fingers have the object confined therebetween the object will be lifted when the handle is lifted. Moreover, the construction of the finger and of its supporting means is such that a holding pressure is separately applied to each finger when the object is engaged by the finger. For example, in the form shown herein the supporting means 11 may comprise a triangular plate of spring steel adapted to flex when the corresponding finger engages a bottle as the device is being lowered.

Referring now to FIG. 2 the invention employs an elongated reciprocable rod 15 housed within handle 10 and having an upper end 16 adapted to abut against a detachable cap 17 on the handle when the rod is in its second or retracted position. Sufficient clearance is provided between the rod and the handle to permit ready movement of the rod solely under the influence of gravity. Detachably secured to the lower end of the rod, and projecting through the finger supporting means, is a litter puncturing member 18 disposed adjacent the finger supporting means (as seen in FIG. 1) while the rod is in its retracted position. Accordingly, when a fracturable object, such as a glass bottle, is being retrieved the fingers are able to function without interference by the puncturing member.

Formed on the periphery of the rod is a pair of suitably spaced grooves 19, 20 into which a detent 21 is adapted to be selectively engaged. This detent may comprise a supporting bracket 22 at a convenient location on the handle and with a pivoted lever 23 biased with a leaf spring 24 normally moving the detent through a hole in the handle wall into engagement within one of the grooves. In addition, a disc-like plate 25 rigidly affixed to the lower portion of the rod serves not only to guide the rod in its movement within the handle, but also to limit the downward free fall of the rod when such plate contacts the abutment 26 projecting inwardly from the handle and fixed to that handle. The mass of the rod preferably is such that when the rod is permitted by the detent to fall into the dotted line position of FIG. 2, the member 18 will be driven into the litter L and will puncture the same without requiring a pushing action on the part of the operator. Furthermore, if a pushing action is necessary in order to puncture an object, this may be performed by first allowing the rod to drop until the detent is engaged in the groove 19 and then pushing downwardly until the member 18 punctures the litter.

The operation of the device will be self-evident and its flexibility of use made apparent from the following description. When used for retrieving bottles or the like the user leaves the detent engaged in lower groove 20 and merely lowers the device so that the fingers engage the bottle as shown in FIG. 1 after which the device is raised and the bottle disengaged and discarded. When used for retrieving litter L the user optionally may dispose the handle above the litter with the tips of the fingers resting on and holding the litter in place and then release the detent so that the weight of the rod causes the rod to drop and to drive the member 18 into the litter. After this the handle is raised and inverted; the impaled litter is removed; and the rod is permitted to slide to its first or retracted position at which time the detent again engages in groove 20.

Alternatively, the user may release the detent and allow the rod to fall until the detent engages in groove 19; thereafter position the member 18 above litter L and push downwardly until the litter is impaled and without having the tips of the fingers touch the litter.

Various advantages of the construction disclosed will also be apparent. The cap 17 which fits upon the handle may readily be removed to permit withdrawal of the rod and to substitute lighter or heavier rods, if desired. The puncturing member 18 may be detached and replaced by a different member, and the general simplicity of the structure as a whole permits its use by unskilled users.

Obviously many modifications and variations of the present invention are possible in the light of the above disclosure. It is therefore to be understood that within the scope of the appended claims the invention may be practiced otherwise than as specifically described.

What is claimed is:

1. A device for retrieving diverse forms of litter comprising, an array of substantially uniformly spaced fingers adapted for grasping an article therebetween, means for supporting said fingers at the upper ends thereof, a hollow handle projecting upwardly from said finger-supporting means, a reciprocable rod slidably disposed within said handle and having a litter-piercing member at its lower end, said rod projecting through said finger-supporting means and being movable between a first extended position disposing said member beyond the distal ends of said fingers and a second retracted position disposing said member adjacent said finger-supporting means, said member when in said second position permitting said fingers to engage said article without interference from said member, and manually operated means for selectively latching said rod in either of said first and said second positions.

2. A device as defined in claim 1 wherein said finger-supporting means applies an article holding pressure separately to each finger as the finger engages the article.

3. A device as defined in claim 1 including a cap on said handle serving to limit movement of said rod in its retracting direction and an abutment on said handle serving to limit movement of said rod in its extending direction.

* * * * *